United States Patent [19]

Cooper

[11] Patent Number: 5,185,620
[45] Date of Patent: Feb. 9, 1993

[54] EYEGLASS SYSTEM

[76] Inventor: George F. Cooper, 2411 Crofton La., Crofton, Md. 21114

[21] Appl. No.: 748,415

[22] Filed: Aug. 22, 1991

[51] Int. Cl.$^5$ ............................................. G02C 11/02
[52] U.S. Cl. ........................................ 351/52; 351/51;
351/111; 351/113; 351/153
[58] Field of Search ................ 351/51, 52, 111, 153

[56] References Cited

U.S. PATENT DOCUMENTS 3,582,192  6/1971  Gitlin et al. ............................ 351/52
4,806,008  2/1989  Tarloff .................................... 351/52

Primary Examiner—Bruce Y. Arnold
Assistant Examiner—Hung-Xuan Dang
Attorney, Agent, or Firm—Morton J. Rosenberg; David I. Klein

[57] ABSTRACT

An eyeglass system (10) is provided for mounting aesthetic trim members (20) on an eyeglass frame or attachment member (12). Aesthetic or trim members (20) are removably securable and slidably mounted on a portion of a frame transverse extension member (28) which in turn is rigidly secured to the eyeglass frame or attachment member (12). The aesthetic member (20) is releasably secured to the eyeglass frame (12) by a spring biased projection mechanism (46) mounted within the temple member (18) of the overall eyeglasses. The spring bias projection member (46) includes a projection member which is slidably displaceable into and out of a path of removal (42) of the aesthetic or trim member (20). In this manner, differing aesthetic members (20) may be interchanged by the user at his or her discretion.

21 Claims, 2 Drawing Sheets

EYEGLASS SYSTEM

BACKGROUND OF THE INVENTION

1. Field of the Invention

This invention is related to an eyeglass system which allows interchangeability of various attachments to an eyeglass frame. The subject eyeglass system further directs itself to individual trim members which may be aesthetically pleasing and which are releasably captured to the eyeglass frame. In particular, this invention directs itself to a releasable securement mechanism mounted within the temple member of eyeglasses which allows a path of removal of an aesthetic member to be blocked during use. Still further, this invention directs itself to an eyeglass system where a releasably securable trim attachment mechanism is mounted within at least one of the temple members of a pair of eyeglasses and may be manually displaced to release the trim member from securement with an eyeglass frame. Additionally, this invention directs itself to an eyeglass system which includes a releasably securable ear piece of individualistic form, contour, shape and/or color which may be releasably secured to a main extension member of the temple. Still further, this invention directs itself to an eyeglass system which permits the addition of a tubular member of varying color to be removably inserted over an extension portion of a temple.

2. Prior Art

Removability of decorative elements on eyeglasses is known in the art. However, removable securement mechanisms to allow removability at the discretion of the user in the manner described has not been found by the Applicant in any prior art known. The best prior art known to Applicant includes U.S. Pat. Nos. 1,973,648; 2,175,896; 2,960,787; 3,010,365; 3,038,375; 3,038,377; 3,209,755; 3,582,192; 4,620,778; 4,776,686; 4,877,320; 4,884,883; 4,909,620; 4,950,066; 4,968,128; 4,974,955; and 4,986,647.

Some prior art such as that shown in U.S. Pat. No. 2,960,787 direct themselves to ornamental spectacles. Such prior art systems use ornamental suspending members having a planar body with rivets secured perpendicularly to the temple contacting surface of the body and include a hook on a surface near the center of the planar body. A particularly shaped hook having jewels or other ornamental designs is removably attached to the hook formed by the slits in the planar body. However, such prior art systems do not allow for the removable securement utilized using a releasable securement mechanism mounted in the temple which blocks the path of removal of a decorative element.

In other prior art such as that shown in U.S. Pat. No. 4,884,883, there are eyeglass or spectacle frames having removable decorative elements. Such frames include lens carrying members having a groove in an outer front surface. Decorative ornaments comprising an elongated member may be mounted to the frame, however, such does not provide for the ease of removal and interchangeability of the subject invention concept.

SUMMARY OF THE INVENTION

There is provided an eyeglass system for an eyeglass lens which includes an eyeglass frame as well as a pair of temples coupled to the eyeglass frame on opposing sides thereof. At least one aesthetic member is removably securable and slidably mountable on the eyeglass frame, and there is further provided a mechanism for releasably securing the aesthetic member to the eyeglass frame where the mechanism for releasable securement is mounted within at least one of the temples. An object of the subject invention concept is to provide a pair of eyeglasses which may be fashionably designed by a user in differing fashion styles.

A further object of the subject invention is to provide a pair of eyeglasses where specific trim members may be releasably secured to portions of the eyeglasses and removed at the discretion of the user.

A still further object of the invention is to provide a pair of eyeglasses which can be formed in an aesthetically pleasing manner by a user to integrate the eyeglasses into wearing apparel worn by the user.

Additionally, another object of the subject invention is to provide a pair of eyeglasses where ear pieces of differing contour, shape and color may be removably secured to the temple members.

Still further, an object of the subject invention is to provide a pair of eyeglasses where a flexible tubular member of differing color, shape and contour may be releasably secured to the temple members to provide additionally aesthetic pleasing effects.

DESCRIPTION OF THE PREFERRED EMBODIMENTS

Figures 1, 2:
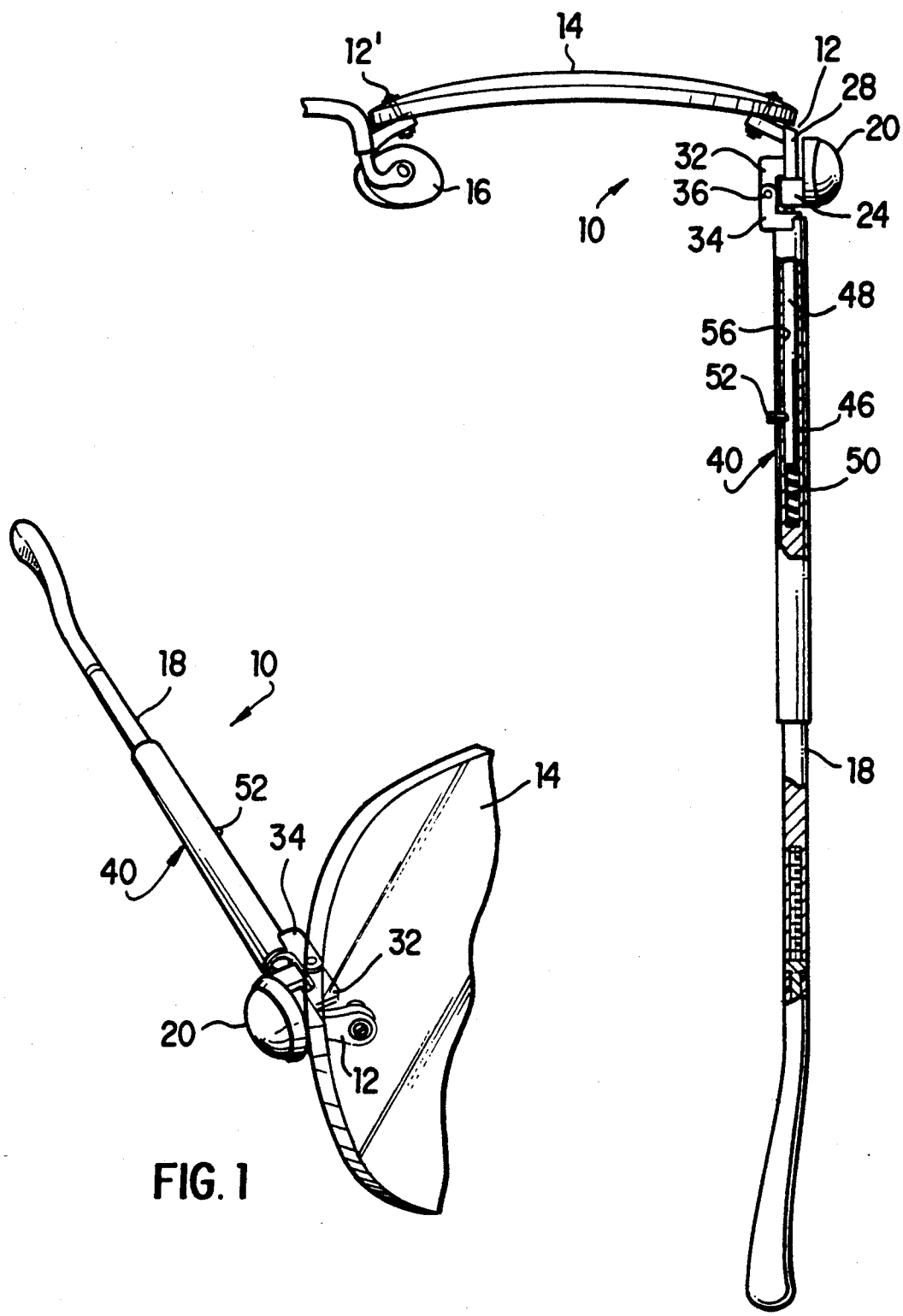
FIG. 1 is a perspective, partially cut-away view of the subject eyeglass system.
FIG. 2 is a plan view partially cut-away of the subject eyeglass system.
Figure 3:
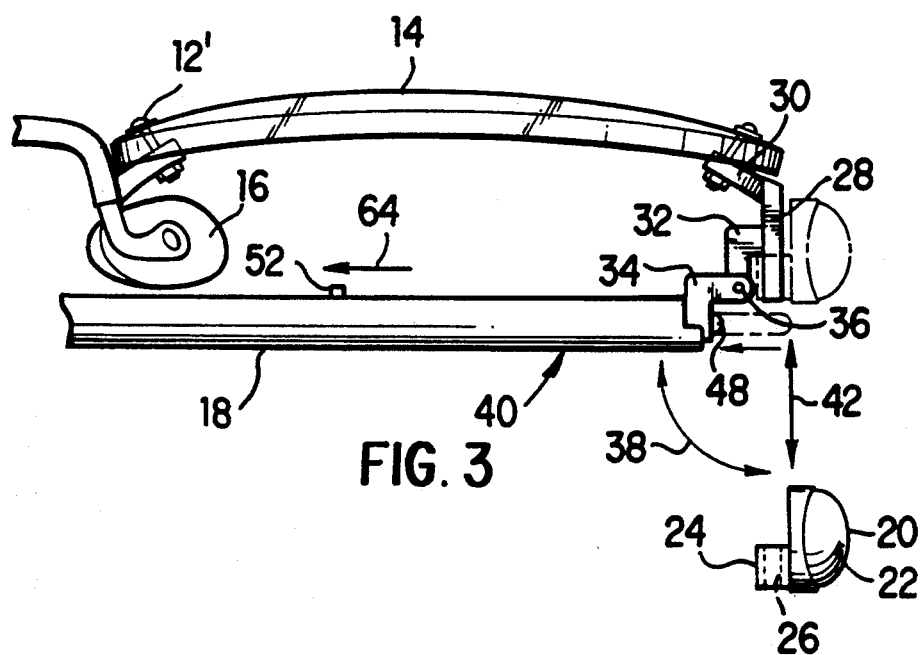
FIG. 3 is a plan view of the subject eyeglass system partially cut-away showing the temple members in a closed position.

Referring now to FIGS. 1-3, there is shown eyeglass system 10 for increasing the aesthetic qualities associated with eyeglasses and particularly adapted to allow interchangeability to permit aesthetic trim members 20 to be integrated with a particular dress code of a user. Eyeglass system 10 includes eyeglass lenses 14 and eyeglass frame or lens attachment 12, as shown in FIGS. 1 and 2. Eyeglass frame or lens attachment 12 may be of a variety of shapes and contours and may include a frame passing around the outer periphery of eyeglass lens 14, or in the alternative as shown in FIGS. 1 and 2, may be secured to eyeglass lens 14 through a bolt or like coupling technique.

In overall concept, aesthetic or trim member 20 is provided for releasable capture to a pair of eyeglasses and such trim or aesthetic members 20 may be of differing shapes, contours, colors, or forms which may be interchanged by the user, depending upon a variety of parameters. Trim or aesthetic members 20 as herein described may be easily replaced and may be interchanged to provide an individual aesthetically pleasing effects when wearing a pair of eyeglasses in coordination with particular apparel.

As will be described in following paragraphs, trim member 20 is releasably mounted to lens attachment or eyeglass frame 12 and is maintained in captured relation thereto when the eyeglasses are being worn by the user.

As shown in FIGS. 1 and 2, temple members 18 are in an open position wherein the extended length of temples 18 extend in a direction which is substantially normal to a plane of lenses 14. In this temple open position, the eyeglasses are generally mounted on the head of a user in operating fashion. As shown in FIG. 3, temple member 18 is in a closed position wherein the extension length of temple member 18 extends in a direction substantially parallel to a plane of lens 14. Whether temple member 18 is in an open position as shown in FIGS. 1 and 2, or in a closed position as shown in FIG. 3, as will be described in following paragraphs, aesthetic member 20 is maintained in a captured relation to lens attachment or eyeglass frame 12. When it is desired to change a particular trim member 20 to another type of trim 20, the user may easily and manually release trim member 20 from lens attachment 12 and insert the differing aesthetic member 20 on eyeglass frame or attachment member 12.

In overall concept, eyeglass system 10 includes a pair of lenses 14 coupled to eyeglass frame or lens attachment 12 in commonly accepted form. As shown in FIG. 2, nose piece 16 is mounted to an eyeglass lens attachment 12′, and as is understood, only one symmetric portion of the overall eyeglasses are shown, however, as is evident, all mechanisms herein described apply to two temple members 18, although only one mechanism description is herein provided.

Referring in particular to FIG. 3, trim or aesthetic member 20 includes trim member face 22 which is shown as a hemispherical contour, however, such may be of varying form and shape, as well as having differing colors to give an aesthetically pleasing affect. Trim member 20 further includes trim lug member 24 extending from a lower surface, as shown in FIGS. 2 and 3.

Trim lug member 24 includes lug through passage 26 which allows trim member 20 to be slidably displaced onto frame or attachment transverse extension member 28. The cross-sectional area contour of frame transverse extension member 28 is not important to the inventive concept as herein described, with the exception that such is of sufficient size to matingly engage trim lug through passage 26 in order that frame transverse extension member 28 may be slid onto trim member 20 in the manner shown in FIGS. 1, 2 and 3.

Frame transverse extension member 28 is fixedly secured to frame attachment member 30 on one end and includes transverse lug member 32 which is hingedly mounted to temple member 18 through temple lug member 34. Temple lug member 34 is rigidly secured to temple member 18 and is pivotally mounted to transverse lug member 32 about pivot point 36, as is clearly seen in FIG. 3. In this manner, eyeglass frame 12 is rotatably displaceable in the direction as shown by arcuate directional arrow 38 of FIG. 3. Further, temple member 18 may in this manner be rotatably displaced between an open position shown in FIGS. 1 and 2 and the closed position depicted in FIG. 3. Eyeglass system 10 further includes releasable securement mechanism 40 clearly shown in FIGS. 1-3 for releasably securing aesthetic trim member 20 to eyeglass frame or lens attachment 12. As is seen, releasable securement mechanism 40 is mounted within temple member 18 for intercepting a path of removal of trim or aesthetic member 20 when trim member 20 is in the open position shown in FIGS. 1 and 2, or in the closed position as depicted by FIG. 3.

As will be seen, releasable securement mechanism 40 intercepts the path of insertion and removal of aesthetic member 20 from and to eyeglass frame or attachment 12 where the path of direction is depicted by directional arrow 42, as shown in FIG. 3.

Releasable securement mechanism 40 includes spring bias projection mechanism 46 having projection member 48 and coiled spring 50 mounted within a longitudinally extended recess of temple member 18. Projection member 48 is slidably mounted within the longitudinally extended recess of temple member 18 and has sufficient length to block the path of removal 42 of trim member 20 when the eyeglasses are in the closed position as shown in FIG. 3 and depicted by the phantom line drawings of projection member 48.

When temple members 18 are in the open position as shown in FIGS. 1 and 2, it is clear that trim member 20 is captured on frame transverse extension member 28 and is blocked from removal in the direction 42 by temple lug member 34 and projection member 48.

Temple member 18 includes temple tubular section 56 within which is mounted projection member 48 and spring bias projection mechanism 46. Temple tubular section 56 defines the previously described longitudinally extending recess within which projection member 48 is slidably displaceable. Spring member 50 is biased in a manner such that projection member 48 is displaced into a blocking extension length when taken with respect to path 42 of trim member 20, as shown in FIG. 3, when temple member 18 is in the previously described closed position.

Knob member 52 is fixedly secured through some type of known fixed securement mechanism, such as welding, to projection member 48. As can be seen clearly in FIGS. 1-3, knob member 52 extends beyond an external wall of temple tubular section 56 in a radial manner and may be manually moved in a longitudinal direction 64. Knob member 52 extends through a temple slot formed in the sidewall of temple tubular section 56 to allow displacement of knob member 52 in longitudinal direction 64 in a reversible manner.

In this manner, knob member 52 may be displaced, forcing projection member 48 to a position as shown in FIG. 3 where projection member 48 does not intersect the path of path direction 42. Trim member 20 may then be mounted on frame transverse extension member 28 and projection member 48 released to a position as shown by the phantom line drawing of FIG. 3, where projection member 48 intersects the removal path of trim member 20 and maintains trim member 20 in a releasably captured manner to overall eyeglass frame or attachment member 12.

Figure 4:
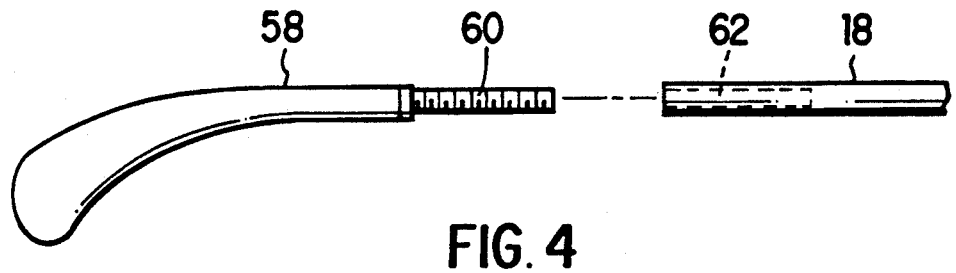
FIG. 4 is an elevational view of a temple member showing a removably insertable ear piece; and, FIG. 5 is a perspective view of a tubular member which may be inserted over at least a portion of a temple member.

Referring now to FIG. 4, there is shown temple member 18 having removably secured thereto ear piece 58. Ear piece 58 may be formed in differing contours and shapes and aesthetically pleasing colors for integration with the user's clothing and/or with a particularly aesthetic pleasing trim member 20. Ear piece 58 includes threaded section 60 which may be threadedly engaged with temple threaded section 62. In this manner, varying aesthetically differing ear piece members 58 may be removably secured to temple member 18 to provide the user with the capability of changing ear pieces 58 at his or her discretion.

Figure 5:
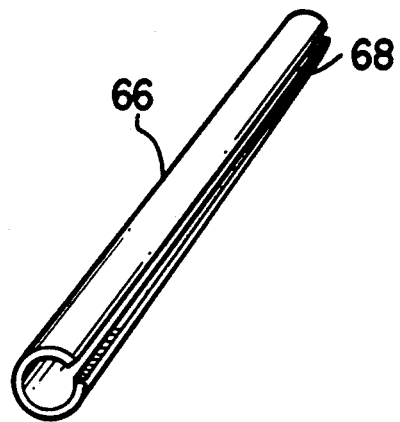

Referring now to FIG. 5, there is shown flexible tubular member 66 having through slot 68 passing therethrough in longitudinal direction 64. Tubular member 66 may be formed of a flexible plastic composition or some like composition not important to the inventive concept as herein described, with the exception that the compositional material of tubular member 66 allow insertion of tubular member 66 over temple member 18. Tubular member 66 may be of differing colors for integration of tubular member 66 with ear piece 58 and trim member 20, as has hereinbefore been described. In this manner, the user at his or her behest may vary the overall eyeglass aesthetic effect within a wide range for integration with other wearing apparel parameters.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An eyeglass system for an eyeglass lens comprising:
   (a) an eyeglass frame, said eyeglass frame having a pair of frame lug members extending from opposing sides thereof;
   (b) a pair of temple coupled to said eyeglass frame on opposing sides thereof, each of said temples being pivotedly coupled to a respective one of said frame lug members;
   (c) at least one aesthetic member removably securable and slidably mountable on one of said frame lug members of said eyeglass frame; and,
   (d) means for releasably securing said aesthetic member to said eyeglass frame, said means for releasable securement being mounted within at least one of said temples.

2. The eyeglass system as recited in claim 1 where said temple includes a temple lug member secured to a first end of said temple member, said temple lug member being pivotally coupled to said frame lug member for permitting said temple member to be pivotally displaced to (1) an open position wherein said temple member extends substantially normal said eyeglass lens; and, (2) a closed position wherein said temple member extends substantially paralel said eyeglass lens.

3. The eyeglass system as recited in claim 2 where said aesthetic member includes a through passage formed therethrough for insert of said frame lug member.

4. The eyeglass system as recited in claim 2 where said means for releasably securing said aesthetic member includes spring biased projection means for blocking a path of insertion and removal of said aesthetic member from said frame lug member when said spring biased projection means is in a first position when said temple member is in said closed position.

5. The eyeglass system as recited in claim 4 where said spring biased projection means unblocks said path of insertion and removal of said aesthetic member when said spring biased projection means is displaced to a second position when said temple member is in said closed position.

6. The eyeglass system as recited in claim 4 where said spring biased projection means blocks said path of insertion and removal of said aesthetic member when said temple member is in said open position.

7. The eyeglass system as recited in claim 4 where said spring biased projection means includes:
   (a) a spring member positionally located within an extended recess formed within at least one of said temples; and,
   (b) a projection rod member located and displaceable within said recess, said projection rod member having opposing first and second ends, said projection rod member second end being in contiguous interface with said spring member and said first end extending from said temple.

8. The eyeglass system as recited in claim 7 including means for displacing said projection rod member from said first position to said second position.

9. The eyeglass system as recited in claim 7 where said projection rod member is displaceably captured in said temple.

10. The eyeglass system as recited in claim 9 including a displacement knob member fixedly coupled to said projection rod member for manual displacement of said projection rod member within said recess of said temple.

11. The eyeglass system as recited in claim 1 where said temple extends in a longitudinal direction having said first end adjacent said eyeglass frame and an opposing second end, said means for releasable securement being mounted on said temple first end.

12. The eyeglass system as recited in claim 11 including a removable aesthetic ear piece member mounted to said second end of said temple.

13. The eyeglass system as recited in claim 12 where said aesthetic ear piece member is removably secured to said second end of said temple.

14. The eyeglass system as recited in claim 13 where said aesthetic ear piece member is threadedly coupled to said second end of said temple.

15. The eyeglass system as recited in claim 1 including an aesthetic tubular member removably insertable over at least a portion of said temple member.

16. An eyeglass system comprising:
   (a) means for mounting an aesthetic member to an eyeglass frame, said aesthetic member being insertable on and removable from said eyeglass frame; and,
   (b) means for releasably securing said aesthetic member to said eyeglass frame, said means for releasably securing being mounted at least partially within a temple of said eyeglass system, said means for releasably securing including a projection rod member located at least partially within a recess formed in said temple, said projection rod member extending from one end of said temple.

17. The eyeglass system as recited in claim 16 where said projection rod member is displaceably captured within said temple.

18. The eyeglass system as recited in claim 17 where said projection rod member is in contiguous interface with a spring member located within said recess of said temple.

19. The eyeglass system as recited in claim 17 where said projection rod member is displaceable into a path of removal of said aesthetic member for blocking removal of said aesthetic member from said eyeglass frame.

20. The eyeglass system as recited in claim 16 including an ear piece member threadedly secured to said temple.

21. The eyeglass system as recited in claim 16 including a flexible tubular member removably mounted on at least a portion of the extended length of said temple member.

* * * * *